United States Patent [19]

Corrette

[11] 4,408,418

[45] Oct. 11, 1983

[54] METHOD OF FORMING THROUGH-FEED CYLINDRICAL THREAD ROLLING DIES

[75] Inventor: Richard H. Corrette, Cleveland, Ohio

[73] Assignee: Colt Industries Operating Corp., Cleveland, Ohio

[21] Appl. No.: 314,688

[22] Filed: Oct. 26, 1981

Related U.S. Application Data

[62] Division of Ser. No. 113,719, Jan. 21, 1980, abandoned.

[51] Int. Cl.³ .............................................. B23G 1/36
[52] U.S. Cl. ................................. 51/288; 51/95 TG; 76/101 B; 72/104
[58] Field of Search ............... 72/78, 98, 102, 103, 72/104, 469; 51/95 TG, 206 R, 288; 76/107 R, 101 B, 101 R, 4; 10/141 R, 152 R; 408/221

[56] References Cited

U.S. PATENT DOCUMENTS

| | | | |
|---|---|---|---|
| 1,702,160 | 2/1929 | Hanson | 51/206 P X |
| 3,023,546 | 3/1962 | Beck | 51/288 X |
| 3,347,114 | 10/1967 | Van Vleet | 76/101 B |
| 3,561,171 | 2/1971 | Van Vleet | 10/141 R |
| 3,651,678 | 3/1972 | Zook et al. | 10/152 R X |
| 4,119,079 | 10/1978 | Junker | 51/288 X |

FOREIGN PATENT DOCUMENTS

| | | | |
|---|---|---|---|
| 2046287 | 3/1972 | Fed. Rep. of Germany | 72/104 |
| 1100772 | 9/1955 | France | 51/288 |
| 553091 | 5/1977 | U.S.S.R. | 51/288 |

Primary Examiner—Frederick R. Schmidt
Assistant Examiner—Robert P. Olszewski
Attorney, Agent, or Firm—Pearne, Gordon, Sessions, McCoy, Granger & Tilberry

[57] ABSTRACT

A cylindrical through-feed thread rolling die having a tapered lead-in portion, a cylindrical dwell portion, and a tapered exit portion is disclosed. Such die provides uniform spacing between the crests of the thread forms thereon throughout the lengths of the die. The spacing between the roots of the die is uniform except at the junction between the dwell portion and the two tapered end portions, where a larger spacing exists between the roots of adjacent thread forms. Because the crest spacing on the thread forms of the die is uniformly maintained throughout the length of the die, excessive pressures do not exist at the junction between the dwell portion and the two end tapers, and drunken threads on the workpiece being rolled are virtually eliminated.

6 Claims, 13 Drawing Figures

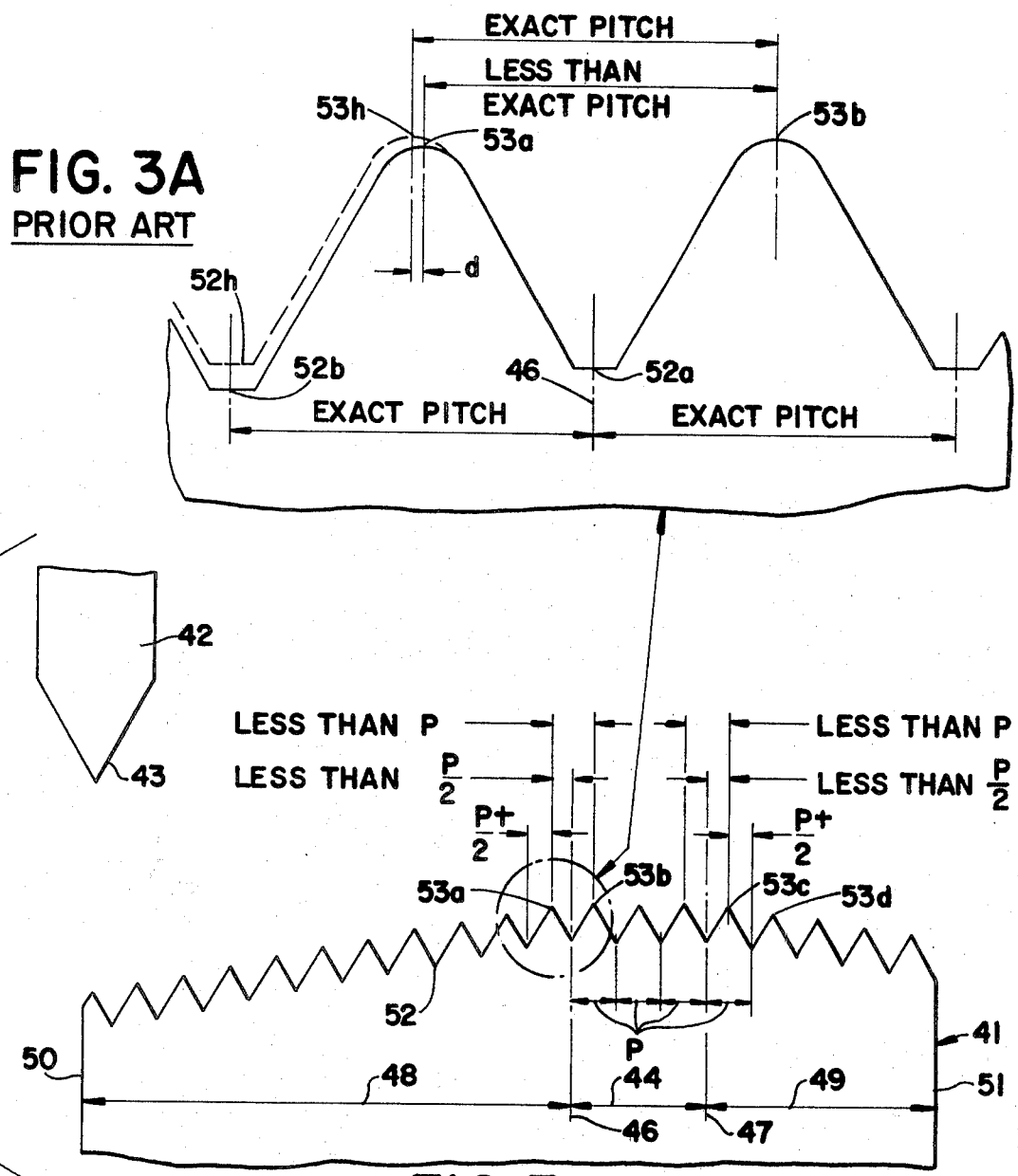
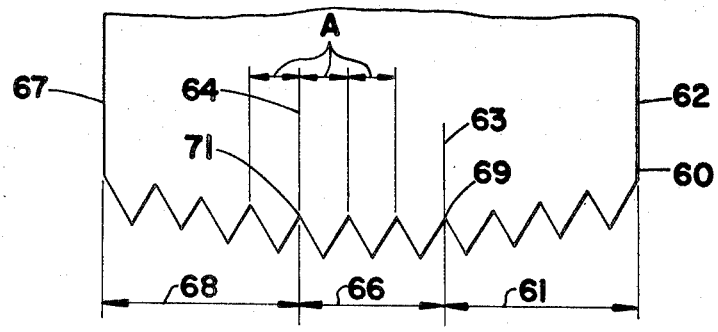

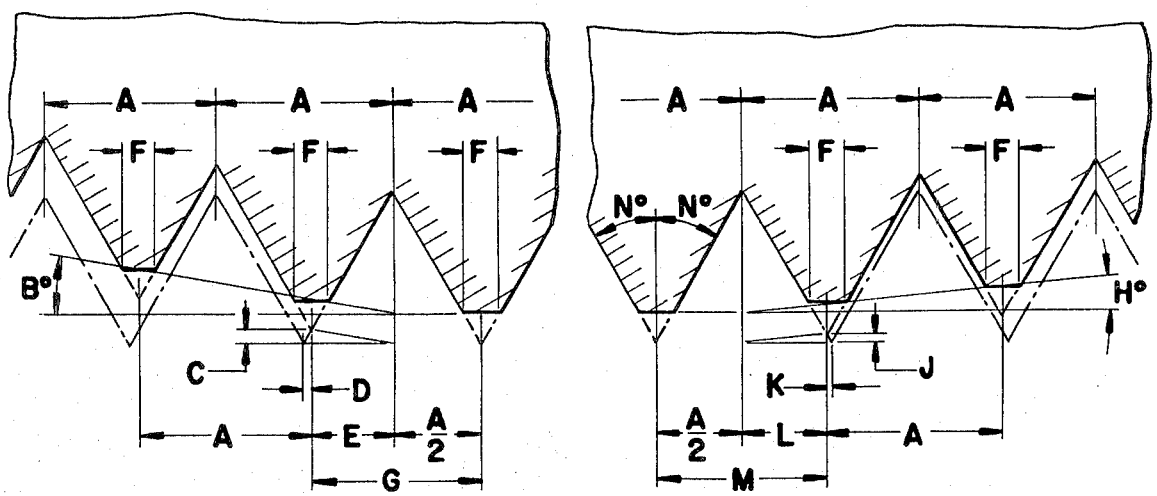
FIG. 5
A = PITCH AS GIVEN
B° = AS GIVEN
C = A/2 X TAN B°
D = C X TAN N°
E = A/2 MINUS D
F = AS GIVEN
G = A MINUS D
H° = AS GIVEN
J = A/2 X TAN H°
K = J X TAN N°
L = A/2 MINUS K
M = A MINUS K
N = AS GIVEN
FIG. 5A
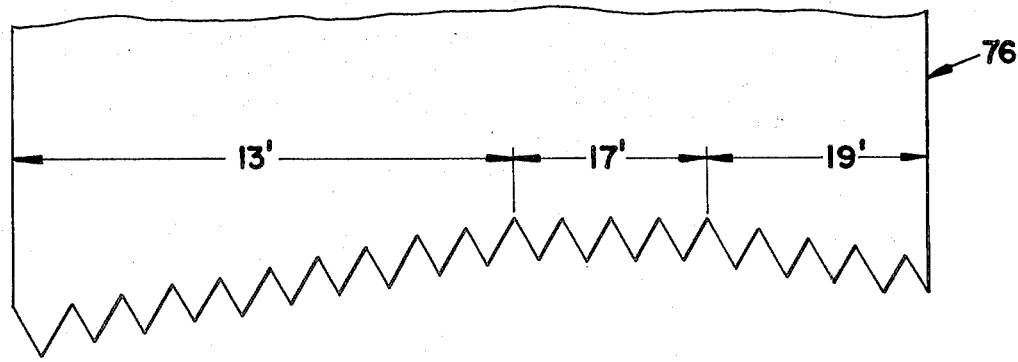
FIG. 6

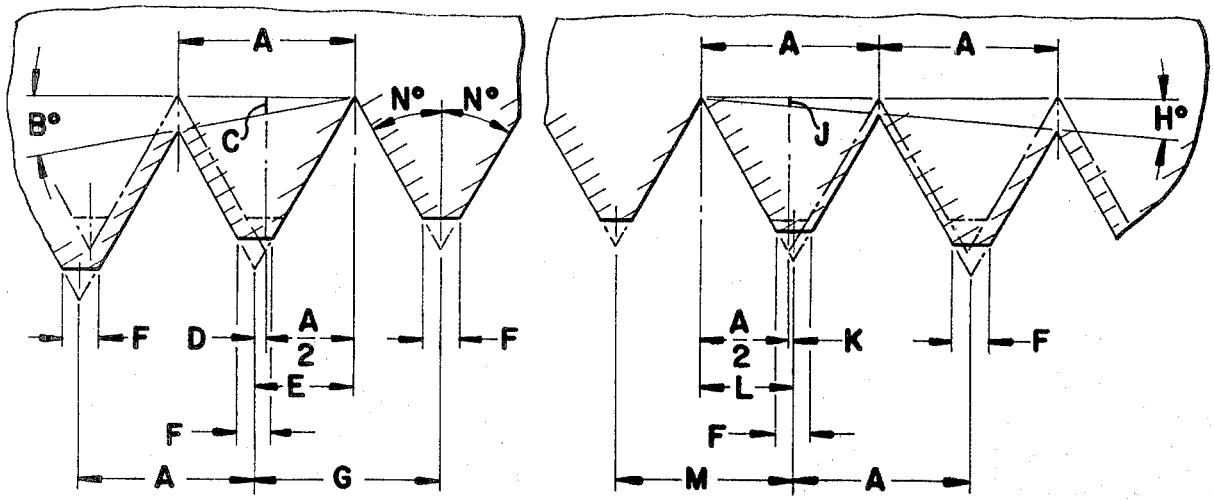
FIG. 7
```
A = PITCH AS GIVEN
B° = AS GIVEN
C = A/2 X TAN B°
D = C X TAN N°
E = A/2 + D
F = ROOT FLAT AS GIVEN
G = A + D
H° = AS GIVEN
J = A/2 X TAN H°
K = J X TAN N°
L = A/2 + K
M = A + K
```
FIG. 7A
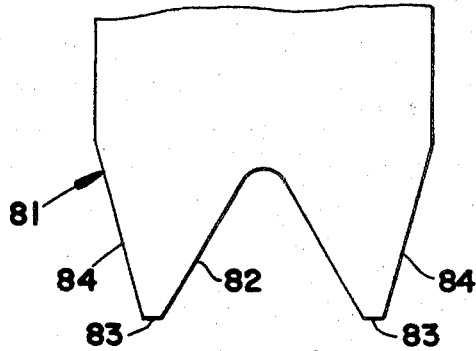
FIG. 8A
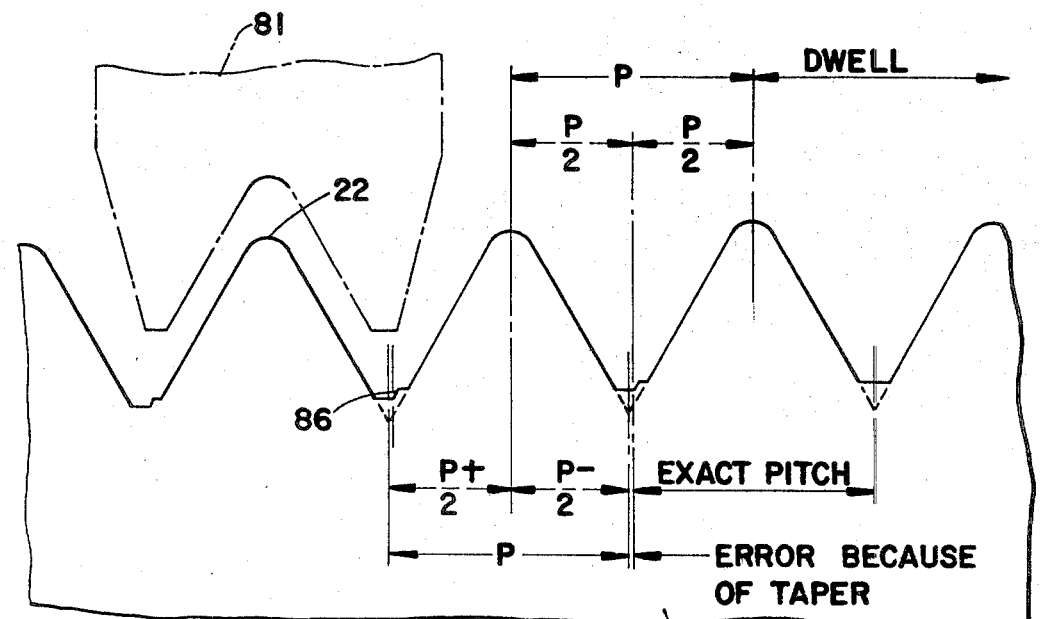
FIG. 8

METHOD OF FORMING THROUGH-FEED CYLINDRICAL THREAD ROLLING DIES

This is a division, of application Ser. No. 113,719, filed Jan. 21, 1980, now abandoned.

BACKGROUND OF THE INVENTION

This invention relates generally to cylindrical thread rolling dies, and more particularly to a novel and improved through-feed, cylindrical thread rolling die, and to a novel and improved method of forming cylindrical thread rolling dies having tapered ends.

Prior Art

Cylindrical thread rolling dies are well known. Generally, such dies fall into two general categories: through-feed dies and in-feed or plunge dies. Through-feed dies are operated so that the work or workpiece feeds axially through the dies as the thread is formed. Such dies may be formed with an annular or non-helical thread form, or may be formed with helical thread forms.

Through-feed dies are normally formed with a conical lead-in taper or ramp portion, a dwell portion of uniform diameter, and a conical exit taper or ramp portion. The thread on each portion of the work is progressively formed as such portion moves in along the lead-in portion of the dies and is substantially completely formed by the time it reaches the dwell portion. Then as the portion of work progresses along the dwell portion of the die, the thread is finished. The principal purpose of the exit portion is to relieve the work gradually to prevent the thread finished by the dwell portion of the die from being damaged.

In the past, most cylindrical thread rolling dies for rolling standard threads having conical ends have been formed by grinding the die with a grinding wheel having a single male thread form. When forming dies which have an annular or non-helical thread, such grinding wheels have been indexed one pitch or lead between each cut and are fed in and out, as required, when grinding the conical end portions of the die.

When manufacturing cylindrical dies having a helical thread form, the same type of grinding wheel has been used, but the indexing of the grinding wheel has been timed with the rotation of the die blank so that the grinding wheel moves axially of the die a distance equal to one lead of the thread being formed each time the work rotates through one revolution. Such indexing has been combined with in-and-out feeding of the wheel or workpiece to form the lead-in ramps and the exit ramps.

Such procedure of using a single male thread form on the grinding wheel and indexing the wheel one lead or pitch produces a lead error at the crests of the threads on the dies at the junction between the two ramp sections and the adjacent ends of the dwell portion. Such lead error, which is discussed in greater detail below, produces excessive loads on the dies at such location, resulting in excessive wear and die breakage. Further, it produces a forked shift in the thread during the forming of the workpiece, which often results in an improperly finished thread and, in some instances, produces what is often referred to as a "drunken thread."

SUMMARY OF THE INVENTION

In accordance with the present invention, a novel and improved cylindrical thread rolling die is provided with lead-in and exit tapers or ramps, and a dwell portion in which the pitch of the thread, in the case of helical threads, or the spacing or pitch between the threads, in the case of annular thread forms, is accurately maintained along the thread crest throughout the entire length of the die. In order to maintain the pitch accuracy at the crest of the thread form on the dies, the dies are formed with a root spacing or pitch at the junctions between the conical end and the dwell portion which is larger than the root spacing along the remainder of the length of the die. Because the spacing or pitch of the crests of the dies is uniform, such dies do not experience excessive pressure, wear, or breakage resulting from thread shift caused in prior art cylindrical thread rolling dies for forming standard straight flanked threads which have crest lead errors. Further, the thread formed on the work is more accurate and the presence of drunken threads is virtually eliminated.

In accordance with the illustrated embodiments of this invention, alternate procedures are illustrated for producing cylindrical thread rolling dies with conical lead-in and exit ramps and a central dwell portion without a crest lead error at the intersections of the dwell portion and the conical ends.

In the first two embodiments, the grinding wheel is formed, usually by crush-forming, with multiple thread forms arranged to produce a die with no lead error in the crests of the threads. In the first embodiment, the die is formed with helical threads and the grinding wheel or the workpiece are fed in and out an appropriate amount as the tapers are being formed at the ends of the dies.

In the second embodiment used to form dies with annular threads, a grinding wheel is again formed with multiple threads, preferably by crush-forming. In such second embodiment, the grinding wheel is formed with a shape which mates with the required die and the entire die length is formed during a single operation in which the die and grinding wheel are fed into each other.

In the third embodiment, the grinding wheel is formed with a single female thread form and is indexed in an amount equal to the lead during each revolution of the workpiece, in the case of dies with helical threads, and by an amount equal to the pitch between each thread in the case of dies with annular threads.

With all embodiments, the dies are formed with no lead or pitch errors at the crests of the dies and improved dies are produced. Further, in all embodiments, there is no need to provide a secondary operation of dressing the thread crests in the dies to eliminate the sharp edges produced with prior art male thread form grinding wheels.

These and other objects of this invention will become more apparent from the following detailed description of the invention.

BRIEF DESCRIPTION OF THE DRAWINGS

FIG. 3 is an enlarged fragmentary section of a prior art cylindrical thread rolling die formed by a single point grinding wheel, which is also illustrated;

FIG. 3A is a greatly enlarged, fragmentary section of the die of FIG. 3 illustrating the junction between one of the conical end portions and the dwell portion where a pitch error exists at the crest of the thread form;

FIG. 4 is a fragmentary section of a grinding wheel used to form the die of FIG. 2 when such die is provided with a helical thread form;

FIG. 5 is an enlarged layout of the tooth form of the grinding wheel of FIG. 4 illustrating the various angles and dimensions utilized to establish the thread form;

FIG. 5A is a table of the angle and dimensional relationships in the layout of FIG. 5 in accordance with this invention;

FIG. 6 is a fragmentary section of a grinding wheel used to form the die of FIG. 2 when such die is provided with annular teeth;

FIG. 7 is a greatly enlarged layout of the tooth form of the grinding wheel of FIG. 6 illustrating the various angles and dimensions for establishing a tooth form;

FIG. 7A is a table of the angle and dimensional relationships of the layout of FIG. 7 to incorporate the present invention;

FIG. 8 is a greatly enlarged view of the fragmentary section of another cylindrical thread profile of the die of FIG. 2 when such die is produced by a grinding wheel having a single final thread form; and FIG. 8A is a fragmentary view of the grinding wheel used to produce the die of FIG. 8.

DETAILED DESCRIPTION OF THE DRAWINGS

Figure 1:
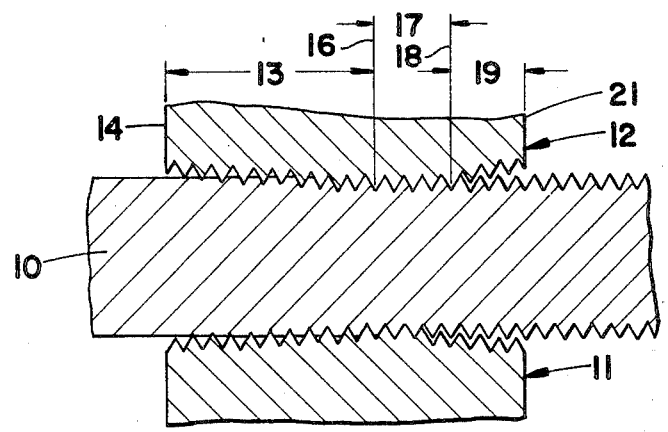
FIG. 1 is a fragmentary, schematic illustration of the operation of cylindrical through-feed dies in which the threads are formed on the workpiece as it feeds through the dies.

FIG. 1 schematically illustrates the through-feed rolling of a workpiece with cylindrical through-feed thread rolling dies. The workpiece 10, as it is rotated by the dies, progressively moves to the right and passes between the dies 11 and 12. The dies are mounted on axes which are skewed with respect to the axis of the workpiece in the usual manner. However, this invention is also applicable to systems where the dies are parallel to the axis of the workpiece. The dies 11 and 12 are formed with either helical thread forms or annular thread forms.

In some instances, there are three dies symmetrically positioned around the workpiece, but in other instances, two dies are used with suitable guides. For purposes of illustration, only two dies are shown in FIG. 1.

Each of the dies is formed with a lead-in taper or ramp portion 13 extending from the entrance end 14 of the dies to a plane or junction at 16. A uniform diameter dwell portion 17 extends from the plane 16 to the plane or junction 18. An exit taper or ramp 19 extends from the plane 18 to the exit end 21 of the die. In the illustrated embodiment, the lead-in ramp 13 and the exit ramp 19 are conical and intersect the adjacent ends of the cylindrical or dwell portion 17 at the planes or junctions 16 and 18, respectively.

In use, the workpiece feeds into the dies from the left side thereof as viewed in FIG. 1, and as a given portion of the workpiece moves inwardly along the lead-in ramps 13, a thread is progressively formed on the surface of the workpiece. When a given portion of the workpiece reaches the dwell portion, the threads are substantially fully formed and substantially fill the thread form on the dies. However, before reaching the dwell portion 17, the thread on the workpiece is only partially formed and the thread forms on the dies are only partially filled.

After passing the lead-in ramps, the portions of the workpiece 10 continue along the dwell portions 17, where the thread is finished. Because the axes of the dies 11 and 12 are skewed with respect to the axis of the workpiece, there is an hourglass effect which causes the maximum penetration of the thread forms on the dies into the workpiece to occur at approximately the midpoint along the length of the dwell portion. There is substantially no working of the threads as they pass beyond the dwell portion to the exit ramps 19, but the exit ramps are generally utilized to provide a gradual release of the pressure on the workpiece so that the threads are not damaged as they exit from the die.

In accordance with the present invention, the crest spacing or pitch of the threads on the thread rolling dies are uniformly maintained throughout the length of the dies so that a thread shift is not produced at the end of the dwell portion 17 where it joins the two ramps 13 and 19. The greatest pressures occur along the crests of the thread forms on the dies, since these portions of the thread forms provide the greatest penetration into the workpiece. Consequently, any shift in pitch or spacing which might exist at the crests has the maximum effect on the threads formed on the workpiece and produces a very high pressure load on the die. On the other hand, little or no pressure exists at the roots of the thread forms on the thread rolling dies, and whatever pressure does exist is at the center of the dwell portion, so a lead or pitch error in the spacing between the roots of the die does not present a particular problem.

Figure 2A:
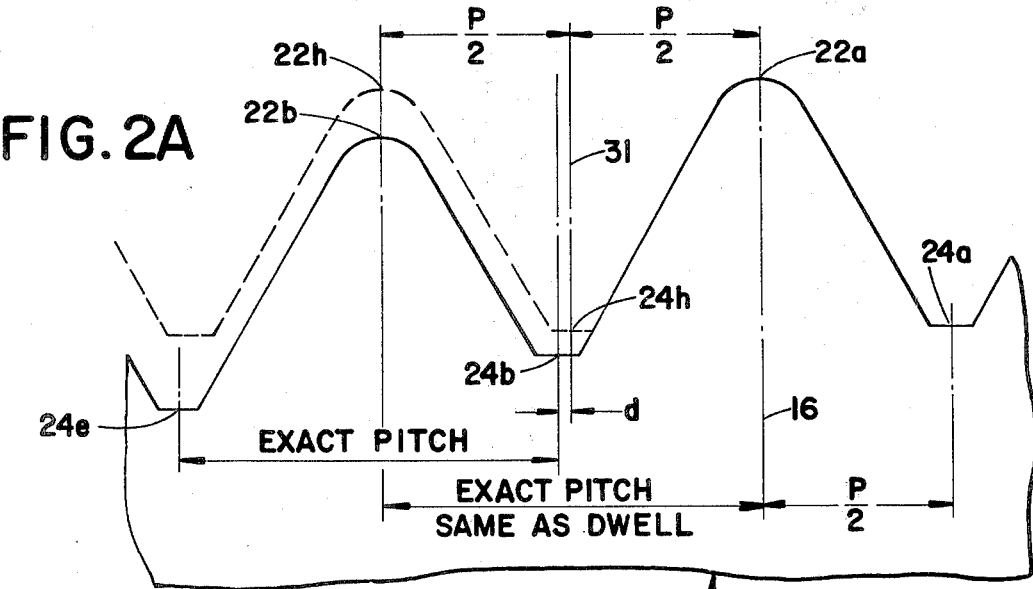
FIG. 2A is a greatly enlarged, fragmentary section of the die of FIG. 2 illustrating the thread form at the junction of one of the conical end portions and the cylindrical dwell portion in which the pitch at the thread crest is uniformly maintained and an enlarged pitch is provided at such junction at the thread root.
Figure 2:
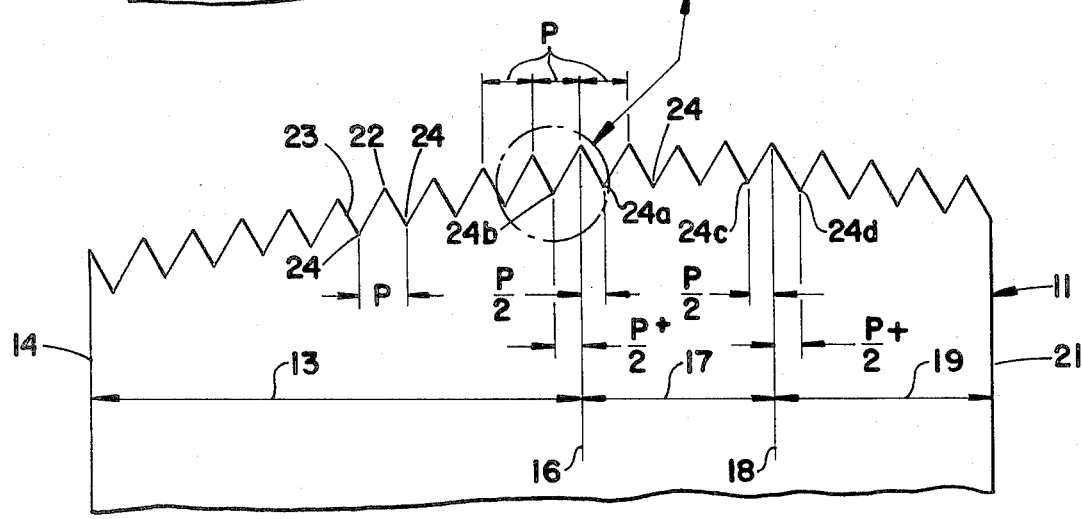
FIG. 2 is an enlarged, fragmentary section of a cylindrical through-feed die in accordance with this invention in which the spacing or pitch of the crests of the thread form is uniformly maintained along the entire length of the die.

FIG. 2 is an enlarged, fragmentary section of the die 11. In accordance with this invention, such die may be formed with a helical thread form or may be formed with annular thread forms. The die 11 is ground so that the spacing or pitch P between the crests of the thread forms is uniformly maintained throughout the lengths of the die even along the junctions 16 and 18 between the dwell and the lead-in taper 13 and the exit taper 19, respectively.

In order to provide this uniform spacing along the crest 22 of the thread form 23, it is necessary to provide an increased spacing between the roots 24 of the thread form 23 at the junctions 16 and 18. In FIG. 2, the pitch or spacing between the crests is illustrated by the distance P. The spacing between the root at 24a and the next adjacent root at 24b is greater than the spacing between the roots 24 at locations spaced from such junctions. This increased spacing between the roots 24a and 24b is necessary in order to ensure that a uniform spacing is provided between the crests 22 along the entire length of the die. A simulat situation exists at the junction 18, wherein an increased spacing is provided between the root 24c and the root at 24d.

The reason for this increased spacing requirement is best illustrated in FIG. 2A, which is a greatly enlarged view of the threads at the junction 16. In FIG. 2A, the thread at the left end of the dwell portion is illustrated along with the first threads along the lead-in ramp 13. In this figure, the projection of the thread forms of the dwell portion are illustrated by dotted line as they would exist if it were not for the existence of the tapered or conical ramp portion.

The last thread crest 22a of the dwell is spaced from the last root 24a by a distance equal to P/2, or one-half the pitch distance. However, because the thread forms must be produced down along the taper, the next root 24b is at a lower level than it would be if it were not for the taper. If it were not for the taper, the next root would be located at 24h, as indicated by the dotted line projection of the thread forms along the dwell portion. Further, because the root at 24b is at a lower level than the projected root at 24h, it is displaced laterally from the plane 31 by a distance d, where the plane 31 is spaced from the crest 22A by P/2, or one-half the pitch. The crest at 22b, which is the first crest located on the lead-in taper 13, is spaced from the crest 22a by an exact pitch and is located in direct alignment with the projected crest 22h.

As the thread forms extend down along the lead-in taper, the exit pitch is again established at the roots, as illustrated between 24b and 24e. The variation in the spacing between the root exists only between the first root on the dwell and the adjacent root on the lead-in ramp. It should be recognized that for purposes of illustration, the ramp angle is exaggerated in the drawing and that the displacement error d at the roots is of a relatively small magnitude.

Since the penetration of the crests 22 into the workpiece is continuing as a given portion of the workpiece moves between the location of the crest at 22b and 22a, the material of the workpiece does not fully fill the roots of the threads at 24b, but only achieves a condition of full filling as such part of the workpiece moves up to and along the dwell 17. Because a shift in the partially formed thread on the workpiece is not required when the workpiece is rolled with the die in accordance with the present invention, excessive pressures do not develop on the die and excessive wear or die breakage does not occur. Further, since the shift is not present in the workpiece, "drunken threads" do not exist.

A similar enlarged spacing is provided at the junction 18 between the dwell 17 and the exit taper where the spacing between the roots at 24c and 24d is slightly larger than the spacing between the roots along the remainder of the die. With the present invention, uniform spacing of the thread crests on the dies is maintained throughout the entire length of the die and a similar uniform spacing at the roots exists except at the two junctions between the dwell portion and the lead-in and exit ramps.

FIG. 3 illustrates a prior art through-feed cylindrical thread rolling die 41 of the type formed with a single point grinding wheel 42 having a single thread form 43 on its periphery. Such die 41 is provided with a dwell portion 44 of uniform diameter between the two planes 46 and 47 at the ends of the dwell portion. A conical lead-in ramp 48 is provided between the plane 46 and the entrance end 50 of the die. Similarly, a conical exit portion 49 is provided between the plane 47 and the exit end 51 of the die.

When a single point grinding wheel 42 has been used to produce a through-feed cylindrical thread rolling die, the practice has been, in the case of dies with annular thread forms, to index the wheel 42 a distance equal to one pitch as each thread form is ground onto the die. Suitable in-and-out movements are also provided after the indexing operation to produce the thread forms of the desired depth along the three portions of the die.

In the case of the manufacture of a die with helical thread forms thereon, the grinding wheel 42 is indexed along the die in a manner which is timed with the rotation of the die blank so that the grinding wheel moves axially with respect to the die a distance equal to one lead of the thread being formed each time the work rotates through one revolution. This operation produces a uniform spacing of the roots 52 of the thread, where the spacing is equal to one pitch distance, throughout the entire length of the die. However, a lead error occurs at the junctions between the dwell portion and the lead-in and exit ramps at the crests of such threads where the crest 53a is spaced from the crest 53b by a distance equal to less than one pitch. A similar situation exists where the crest at 53c is spaced from the crest at 53d by a distance less than one pitch.

This lead error at the crests is demonstrated by reference to FIG. 3A, which is a greatly enlarged view of the junction at the plane 46 between the dwell 44 and the lead-in ramp 48. The root 52a is the root formed by the grinding wheel at the end of the dwell 44. The adjacent root 52b is ground to a depth greater than the root 52a, as illustrated by the spacing between the dotted projected root 52h. The spacing of the two roots 52a and 52b is an exact pitch because the root is formed by the extremity of the wheel 42 and the wheel is indexed in exact pitch amount. As a result, the crest at 53a is spaced to the right from the location 53h where the projected crest would have occurred, as indicated by the dotted lines, and the spacing between the crest at 53a and the crest at 53b is less than an exact pitch by an error d. Consequently, with the prior art die of FIG. 3, a thread shift is forced in the workpiece as the workpiece progresses across the junction between the lead-in portion of the die and the exit dwell of the die. A similar shift occurs at the junction between the dwell portion 44 and the exit portion 49, but since the pressure on the die is being relieved at such location, it does not normally produce as much of a problem. In effect, the prior art die has a uniform pitch spacing between the roots of the thread forms on the die and a uniform crest spacing except at the junction of the lead-in and exit portions of the die with the dwell portion thereof. At such junctions, the spacing at the crest is less than the proper spacing and an inferior die is provided. Further, such die produces excessive pressure at the location of the error, which results in wear and breakage.

FIG. 4 illustrates a grinding wheel for use in the manufacture of a die incorporating this invention, as illustrated in FIG. 2, when the die is formed with helically arranged threads. This grinding wheel is shaped with three sections to form the related sections on the die. The wheel 60 is provided with a first portion 61 extending from the right end of the wheel at 62 to a junction plane 63. The portion 61 is formed with a conical shape and is used to grind the lead-in taper 13 of the die of FIG. 2. Extending from the junction plane 63 to a junction plane 64 is a dwell portion 66. The remainder of the wheel extending from the plane 64 to the end face 67 is a taper 68 used to grind the exit ramp or taper 19.

It is preferable to form the grinding wheel so that the dwell 66 extends from one root 69 to another root 71, so that the dwell on the die will end at a thread crest. Further, the length of the various portions should be sufficient to provide a number of thread forms on each portion at least equal to the number of starts required on the die. Since a die is formed with a lead which is greater than the pitch by some multiple, the threads have more than one start. The grinding wheel is formed so that the roots of the thread forms produced thereon are spaced apart by exactly one pitch throughout the entire length of the wheel. With such a structure, the pitch error occurring at the junctions between the dwell portions of the two tapered portions will exist at the crests of the threads on the wheel, with all of the remaining crests properly spaced by one exact pitch.

When the grinding wheel 62 is used to grind a die 11, the wheel is positioned with respect to the die blank at the proper skewed angle so that the annular thread form on the wheel will produce the desired helical thread form on the die. The grinding is accomplished by starting one end 14 of the die and the wheel is fed across the die face while the wheel is withdrawn progressively the proper amount to cause the tapered portion 61 to form the lead-in taper 13. When the plane 63 reaches the position opposite the plane 16 on the die, the retraction is terminated and the grinding wheel feeds across the dwell portion forming the threads on the dwell portion 17 with the dwell portion 66 of the grinding wheel. When the two planes 18 and 64 reach alignment, infeed is commenced, so that the tapered portion 68 grinds the finish or exit ramp 19 on the die. Because the crests 22 on the die are formed by the roots 66 on the grinding wheel, and since the roots on the wheel are equally spaced the exact distance to produce the required pitch, the thread forms on the die are accurate in crest spacing throughout the length of the die and the lead error or pitch error occurring at the junctions between the ends of the dwell 17 and the two ramps 13 and 19 exists only at the roots of the threads. Consequently, a die in accordance with the present invention is provided with the convex type wheel illustrated in FIG. 4.

Referring to FIGS. 5 and 5A, the grinding wheel of FIG. 4 should be dimensioned as illustrated in FIG. 5, and the dimensions are interrelated as set forth in the Table of FIG. 5A. In FIG. 5, only a portion of the dwell 66 and only portions of the tapered sections 61 and 68 are illustrated, but the remaining portions in an actual grinding wheel should conform to the illustrated dimensions.

The dimension A is the pitch or spacing between adjacent thread form roots and is accurately maintained for all portions of the annular thread form. This dimension is established by the thread to be produced in the manner known to those skilled in the art. The angle B is the angle of the finish or exit ramp required for the particular die. The dimension F is the dimension of the flat and is determined by the thread to be rolled. The angle H, like the angle B, is determined by the angle of the corresponding ramp surface. Finally, the angle N is determined by the thread form to be produced. The lead adjustment to be produced at the crests of the thread form on the grinding wheel so as to maintain the proper dimension A between the roots at all locations along the die is determined as follows: $D = C \times \text{Tan } N^\circ$, where C is equal to $A/2 \times \text{Tan } B^\circ$. The lead adjustment K is similarly related to the angle H and is established in accordance with the formulas of the table.

In producing the grinding wheel for grinding the die, a crush roll is developed which will produce in the grinding wheel the thread forms as illustrated in FIG. 5. With such grinding wheel, the proper thread forms are then established on the die, as described above.

In producing a die having annular thread forms thereon with a single multigroove grinding wheel 76, the grinding wheel itself has at least the same width as the die and the entire length die is ground simultaneously. In such instance, the thrad forms on the grinding wheel are an exact mirror image of the thread forms to be produced on the die. Such grinding wheel illustrated in FIG. 6 will necessarily then be concave in shape, having a central dwell portion 17' convoluted to be a mirror of the dwell portion 17, a lead-in taper portion 13' convoluted to be a mirror of a starting or lead-in ramp 13, and an exit taper portion 19' which is tapered and convoluted to be a mirror of the exit ramp 19. Here again, the spacing between the roots of the thread forms on the grinding wheel must be uniformly maintained to ensure that the spacing between the crests of the thread forms on the die are uniformly maintained. The grinding wheel 76 is concave to produce the required convex die.

FIGS. 7 and 7A are respectively greatly enlarged dimensional views of the grinding wheel 76 having corresponding dimensions to the dimensions illustrated in FIG. 5. However, the various interrelationships are as set forth in the Table of FIG. 7A. Since such relationships are quite similar to those set forth in FIG. 5A and discussed above, they are not repeated herein.

The grinding of a die with a grinding wheel 76 dimensioned as illustrated again produces a die where the spacing of the crests between the thread forms is uniformly maintained throughout the length of the die and the lead adjustment required to establish such uniform spacing at the crests exists at the roots at the junctions between the dwell portion and the two ramp portions of the die.

FIG. 8 is a greatly enlarged view of the thread profile of the die of FIG. 2, when produced by a grinding wheel having a single female thread form, as illustrated in FIG. 8A. Such wheel 81 illustrated in FIG. 8A is provided with a single female thread form 82 and extends to flats 83. The wheel is preferably relieved on the sides at 84 by any angle selected to provide clearance with the adjacent parts on the die.

When the grinding wheel 81 is used to produce a die having annular thread forms thereon, the grinding wheel is fed in an appropriate amount to form the thread form at a given point on the die and is indexed laterally a distance equal to one pitch between each cut. Because the crest of the thread form on the die 11 is produced by the root on the grinding wheel, such indexing of the grinding wheel produces a thread form wherein a uniform spacing is provided at the crests throughout the length of the die. However, along the lead-in and exit ramps, the roots are provided with a step 86 because of the difference in depth of each cut along the ramp sections and the pitch adjustment or error is automatically developed at the root of the thread.

When the die of FIG. 8 is to be formed of a helical thread form, the grinding wheel is indexed along the length of the die a distance equal to one lead during each revolution of the die and is fed in or out, usually by a cam, to properly form the lead-in and exit ramps.

With each of the embodiments, the resulting die is provided with an accurate spacing between the crests of the thread forms on the die to eliminate any thread shift during the use of the die in producing threads on a workpiece. Because these threads shifts do not occur, the existence of drunken threads, excessive pressures on the die, and excessive die breakage are virtually eliminated.

Although the preferred embodiments of this invention have been shown and described, it should be understood that various modifications and rearrangements of the parts may be resorted to without departing from the scope of the invention as disclosed and claimed herein. For example, it is with the broader aspects of this invention to form the dies with cutting tools rather than with grinding wheels.

What is claimed is:

1. A method of forming cylindrical throughfeed thread rolling dies with substantially flat flanks, a leadin taper portion, and a dwell portion comprising forming a grinding wheel with at least one female thread form having substantially straight flanks, and with said grinding wheel grinding both flanks of a thread form on said die with uniform spacing between the crests thereof along the entire length of said die and uniform root spacing except at the junction between said portions wherein the root spacing between adjacent roots is increased, said grinding wheel being formed with a taper section and a uniform diameter section both of which are formed with a plurality of annular tooth forms, and forming said tooth forms on said grinding wheel with uniform spacing between the roots along the entire length of said wheel and forming the spacing between crests on said wheel uniform except at the junction between said sections wherein a greater spacing is provided between adjacent crests, and with said grinding wheel grinding said lead-in taper with said taper section of said grinding wheel and grinding said dwell portion with said uniform diameter section of said grinding wheel.

2. A method of forming cylindrical through-feed thread rolling dies as set forth in claim 1, wherein said grinding wheel is convex, and forming said die by indexing said wheel across said die one lead length for each revolution of said die, and moving said grinding wheel and die radially relative to each other while forming said lead-in taper with said tapered section.

3. A method of forming cylindrical through-feed thread rolling dies as set forth in claim 1, wherein said grinding wheel is concave, and forming said die by in-feeding said die and wheel without lateral indexing therebetween.

4. A method of forming cylindrical through-feed thread rolling dies as set forth in claim 1, wherein the length of each section of said grinding wheel is sufficiently long so that each section is provided with a number of thread forms at least equal to the number of starts required on said die.

5. A method of forming cylindrical through-feed thread rolling dies as set forth in claim 3, wherein said grinding wheel is formed as long as said die and with each section having the same number of thread forms thereon as the corresponding number of thread forms required on corresponding portions of said die.

6. A method of forming cylindrical thread rolling dies with a uniform diameter central portion and a conical end portion on each side of said central portion, comprising forming a grinding wheel with a plurality of thread forms along a central uniform diameter midportion, a first conical ramp on one side of said midportion, and a second conical ramp on the opposite side of said midportion, forming the root spacing of said thread forms of said grinding wheel uniform along the entire width thereof, forming the crest spacing of said thread forms on said grinding wheel uniform along the entire width thereof except at the junctions between said midportion and said first and second conical ramps where the spacing between said crests is greater than the remainder of the spacing between said crests, and grinding thread forms on said dies with said grinding wheel using said first ramp for forming the threads along one conical end portion of said die, said midportion to form the threads along said central portion of said die, and using said second conical ramp to form the threads along the other of said conical end portions of said die.

* * * * *